Patented June 24, 1952

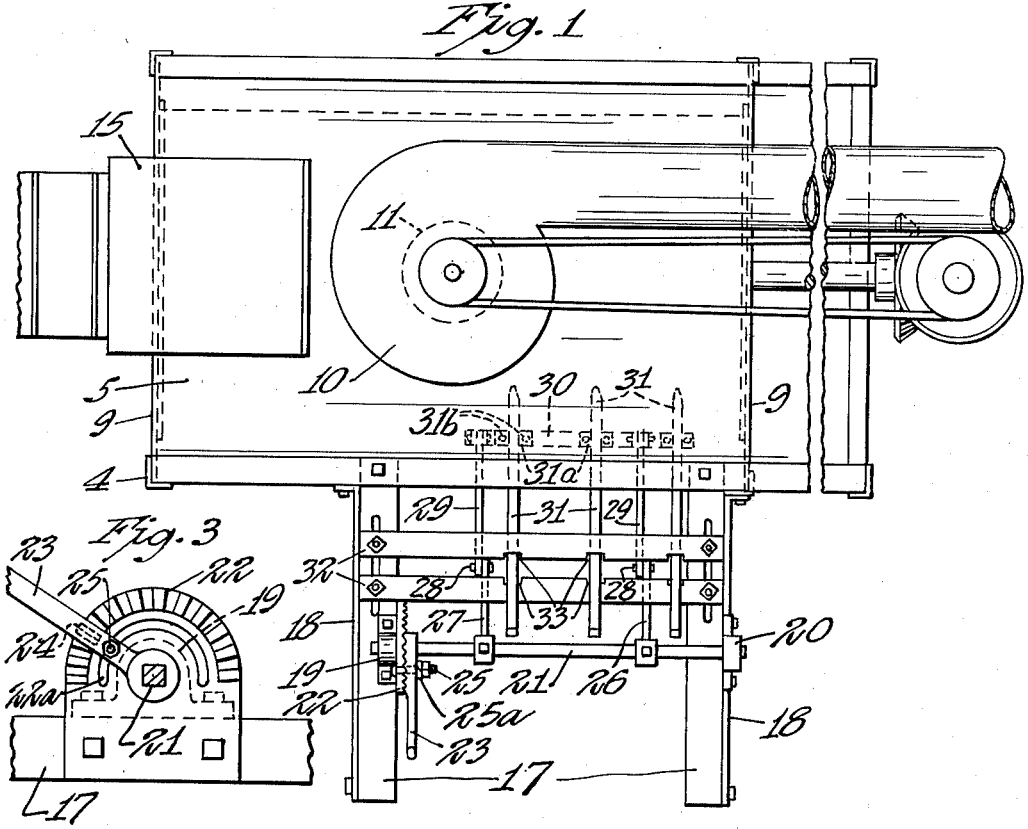

2,601,348

UNITED STATES PATENT OFFICE 2,601,348

HUSK CLEARING DEVICE FOR CORN SHELLERS

Clarence Martin Weinhold, Cottonwood, Minn.

Application March 24, 1947, Serial No. 736,710

4 Claims. (Cl. 130—6)

This invention relates to corn shellers and more particularly to means for preventing corn husks from lapping about the rotary sheller cylinder.

It is an object of the invention to provide corn sheller cylinder clearing means which is relatively stationary and positioned at its inner portion closely adjacent the outer wall of the sheller cylinder so that it will scrape off husks which tend to stick to and wrap around the sheller cylinder particularly when the husks are wet.

Another object of the invention is to provide a husk clearing device for corn sheller cylinders which is arranged to be supported outside of the concave and extend therethrough to a point closely adjacent the cylinder, and wherein the clearing member can be moved inwardly and outwardly toward and away from the cylinder.

Another object of the invention is to provide a husk clearing device for a corn sheller cylinder wherein elongated clearing fingers are slidable longitudinally of themselves into and out of a casing, and a cage therein, toward and away from a cylinder and when shifted outwardly have husks stripped from them.

A further object of the invention is to provide a husk clearing device for a corn sheller cylinder wherein a plurality of elongated clearing fingers spaced transversely from each other longitudinally of the cylinder are slidable longitudinally of themselves toward and away from the cylinder transversely thereof and pass between bars forming a portion of a cage constituting the concave of the sheller in close fitting stripping relation thereto so that as the fingers are shifted outwardly of the cage the bars between which the fingers pass will serve to strip husks from the fingers.

The above and other objects and advantages of the invention will more fully appear from the following description made in connection with the accompanying drawings, wherein like reference characters refer to the same parts throughout the views, and, in which:

Figure 1 is a plan view of a corn sheller with the device attached thereto;

Figure 2 is a view showing the sheller proper in transverse vertical section and the clearing apparatus in side elevation and attached to the sheller; and Figure 3 is an enlarged fragmentary side elevational view of the means for locking the clearing member in position relative to the sheller cylinder.

In Figure 2 there is shown a sheller including upright frame members 4 between which is supported an outer casing 5 which has a lower shelled corn outlet 6. In the casing 5 is a second casing 7 having a shelled corn outlet 8 above the outlet 6. The inner casing 7 is suitably secured to the outer casing end walls 9, as indicated in Figure 1. A blower 10 has an inlet 11 connected to the space between the casings 5 and 7 in the usual manner for drawing off dirt and portions of husks.

Located within the inner casing 7 is a cylindrical cage made up of a plurality of spaced bars 12 which comprise the concave of the sheller as is generally known to the art. Lying within the concave 12 is a rotary cylinder 13 spaced a substantial distance inwardly from the inner side of the concave, and the cylinder 13 is provided with a plurality of longitudinally and circumferentially spaced projecting teeth 14. Ears of corn are fed to an inlet hopper 15 shown in Figure 1, and the cleaned cobs are fed out of an end outlet opening 16 shown in Figure 2. Rotation of the cylinder 13 with its teeth 14 knocks the kernels from the corn cob and they fall through the open spaced bars 12 of the concave and through the outlet openings 8 and 6.

As viewed in Figure 2 the right hand sheller frame section 4 has a pair of horizontal support members 17 secured thereto, the outer ends of said supporting members being held up by braces 18 which are connected by lower portions to the sheller frame 4. Mounted between bearing blocks 19 and 20 is a rocker shaft 21. As viewed in Figure 1 a stationary toothed segment 22 having an arcuate slot 22a is mounted adjacent the bearing block 19. A hand lever 23 is fixed on the shaft 21 and has a tooth 24 thereon which is in spring pressed engagement with the teeth on the segment 22. This pressure is provided by a compression spring 25a mounted on a nutted bolt 25 which extends through the hand lever 23 and is slidable with arcuate slot 22a. Levers 26 and 27 are mounted on the shaft 21 in spaced relation to each other and said levers are pivoted at 28 to links 29 whose inner ends are pivotally connected to a cross member 30 shown in Figure 1. The cross member 30 has several elongated clearing finger elements 31 mounted thereon, said clearing elements extending rearwardly between a pair of spaced bars 32 mounted between the horizontal support members 17. The bars 32 are provided with notches 33 which serve as guides for the clearing finger elements 31, said finger elements being longitudinally shiftable upon movement of the hand lever 23 so that said finger elements will move inwardly and outwardly toward and away from the sheller cylinder 13. It will be noted in Figure 2 that the clearing finger elements 31 extend through an opening 34 in the outer casing 5, an opening 35 in the inwardly concentric casing 7, and between a pair of concave bars 12 in closely spaced stripping relation thereto so that these bars may serve to strip husks from the fingers when the fingers are shifted outwardly.

As shown in the drawings, Figs. 1 and 2, the elongated finger clearing elements 31 are individually connected to cross member 30 by straps 31a and bolts 31b whereby individual adjustment of the finger clearing elements 31 relative to cross member 30 can be accomplished to vary the spacing of individual fingers from the cylinder 13.

When corn is fed to the sheller, if the husks are damp they have a tendency to stick to and wrap around the rotary cylinder 13. If they are permitted to build up a relatively thick layer they will interfere with proper operation of the sheller and in many cases cause it to clog. The clearing fingers 31, however, can be moved inwardly to the full line position of Figure 2 so that they will scrape the husks from the cylinder walls. The clearing fingers 31 are spaced longitudinally of the rotary cylinder 13 so that they are staggered relative to the projecting teeth 14 on the cylinder, and will not interfere with their kernel removing function.

From the foregoing description it will be seen that I have provided a relatively simple yet effective device for clearing the rotary cylinder of a corn sheller of husks which otherwise when wet will stick to the cylinder and build up upon each other to interfere with the proper operation of the machine. When the husks are dry and have no tendency to stick the clearing teeth can be withdrawn by manipulation of the hand lever 23. Even when there is a tendency for the husks to stick to the rotary cylinder the clearing fingers 31 can be withdrawn and again inserted from time to time so that the fingers themselves will be cleaned by stripping action of the bars 12 between which they pass and husks will not accumulate upon them.

It will, of course, be understood that various changes may be made in the form, details, arrangement and proportions of the various parts without departing from the scope of my invention.

What I claim is:

1. In a corn sheller having a stationary cylindrical casing, a stationary cage formed of circumferentially closely spaced horizontal bars constituting stationary abutment elements and disposed within said casing and an inner rotary cylinder with teeth extending outwardly from its cylindrical surface and centrally located within said cage, and means for clearing corn husks from said cylinder, said means including a cross member disposed outwardly from said cage and casing, a plurality of clearing fingers adjustably mounted on said cross member for longitudinal sliding movement with the cross member and projecting through said casing and between said bars of said cage in sliding closely spaced stripping relation therewith to points adjacent said cylinder in staggered relation to said teeth, guiding means outside the casing spaced outwardly from said cross member and engaged by the fingers for guiding said clearing fingers during such movement, a support structure located outside said casing and adjacent thereto, a lever pivoted to said support structure, and linkage between said lever and said cross member causing retraction of said fingers outwardly relative to said bars to a position outside thereof when said lever is pivoted in one direction to positively clear the corn husks which may have accumulated thereupon from said fingers.

2. In a corn sheller including a frame open at its top and having side walls, a cylindrical casing disposed horizontally in said frame between side walls thereof and having a lower corn outlet, there being a cob and shuck outlet formed through an end wall of the casing, rods mounted longitudinally in said casing adjacent its annular wall and spaced from each other circumferentially of the casing and forming a cage, and a cylinder rotatably mounted within the cage and the casing centrally thereof and having outwardly projecting radially extending teeth; the improvement comprising supporting bars carried by one side wall of the frame and projecting outwardly therefrom and spaced from each other longitudinally of the frame, inner and outer cross bars extending between and secured at their ends to said supporting bars and having confronting side edges formed with opposed notches, elongated fingers spaced transversely from each other and slidably passing between the cross bars and seated in companion notches and disposed at a downward incline toward their inner ends and having inner end portions passing through walls of the casing and between certain of the rods in sliding stripping engagement therewith into the cage and terminating adjacent said cylinder in position for dislodging cobs and husks carried about the cylinder by said teeth, upper and lower clamping bars between which said fingers pass adjustably held in gripping engagement with the fingers, bearings carried by said supporting bars, a shaft extending between and rotatably supported by said bearings, levers extending from said shaft, links pivoted at outer ends to said levers and at inner ends to said clamping bars, and a latch lever carried by said shaft and serving to turn the shaft and swing the levers outwardly and thereby exert pull upon said links to slide the fingers outwardly from said cylinder to adjusted positions relative to the cylinder.

3. In a corn sheller, a stationary casing, a stationary cage in said casing having a wall formed of a plurality of longitudinally extending bars spaced transversely from each other, a cylinder rotatably mounted in said casing and surrounded by said cage and having teeth projecting outwardly from its cylindrical surface, and means for clearing husks from said cylinder comprising a support disposed outwardly of said casing, a plurality of elongated clearing fingers spaced transversely from each other longitudinally of the cylinder and being shiftable longitudinally of themselves relative to said support inwardly and outwardly of said casing, said fingers having inner end portions entering the casing and passing through space between certain of said bars in closely spaced stripping relation to the said bars, and operatng means carried by said support and connected with said fingers and serving to shift the fingers inwardly and outwardly of the casing, the fingers having inner ends disposed close to the cylinder in staggered relation to the teeth, and the said bars between which the fingers pass serving to strip husks from the fingers during outward movement of the fingers.

4. In a corn sheller, a stationary casing, a cylinder rotatably mounted in said casing and having teeth projecting outwardly from its cylindrical surface, a cage in said casing about said cylinder having a wall portion formed of bars spaced transversely from each other, and means for clearing husks from said cylinder including a plurality of fingers spaced transversely from each other longitudinally of the cylinder and movable inwardly and outwardly of the casing and disposed transversely of and having inner end portions entering the casing and slidably passing between certain of said bars in closely spaced stripping relation thereto and having inner ends disposed close to said cylinder in clearing relation to its teeth, and actuating means mounted exteriorly of said casing and connected with said fingers and serving to simultaneously shift the fingers longitudinally of themselves into and out of the casing, the bars between which said fingers pass serving to strip husks from the fingers during outward movement of the fingers.

CLARENCE MARTIN WEINHOLD.

REFERENCES CITED

The following references are of record in the file of this patent:

UNITED STATES PATENTS

| Number | Name | Date |
|---|---|---|
| 653,874 | Morris | July 17, 1900 |
| 878,901 | Shelbourn | Feb. 11, 1908 |
| 959,346 | Hummel | May 24, 1910 |
| 953,845 | Knaak | Apr. 5, 1910 |
| 1,110,768 | George | Sept. 15, 1914 |
| 1,229,966 | Jernigan | June 12, 1917 |
| 1,470,314 | Wright | Oct. 9, 1923 |
| 1,509,833 | Gilman | Sept. 30, 1924 |
| 1,521,973 | Specketer | Jan. 6, 1925 |
| 2,003,522 | Thoen | June 4, 1935 |
| 2,271,897 | Mast | Feb. 3, 1942 |
| 2,347,664 | Chilton | May 2, 1944 |

FOREIGN PATENTS

| Number | Country | Date |
|---|---|---|
| 339,783 | France | Apr. 27, 1904 |